March 4, 1941.  V. F. HALLIBURTON  2,234,119
STUFFING BOX MOUNTING
Filed Jan. 31, 1940   2 Sheets-Sheet 1
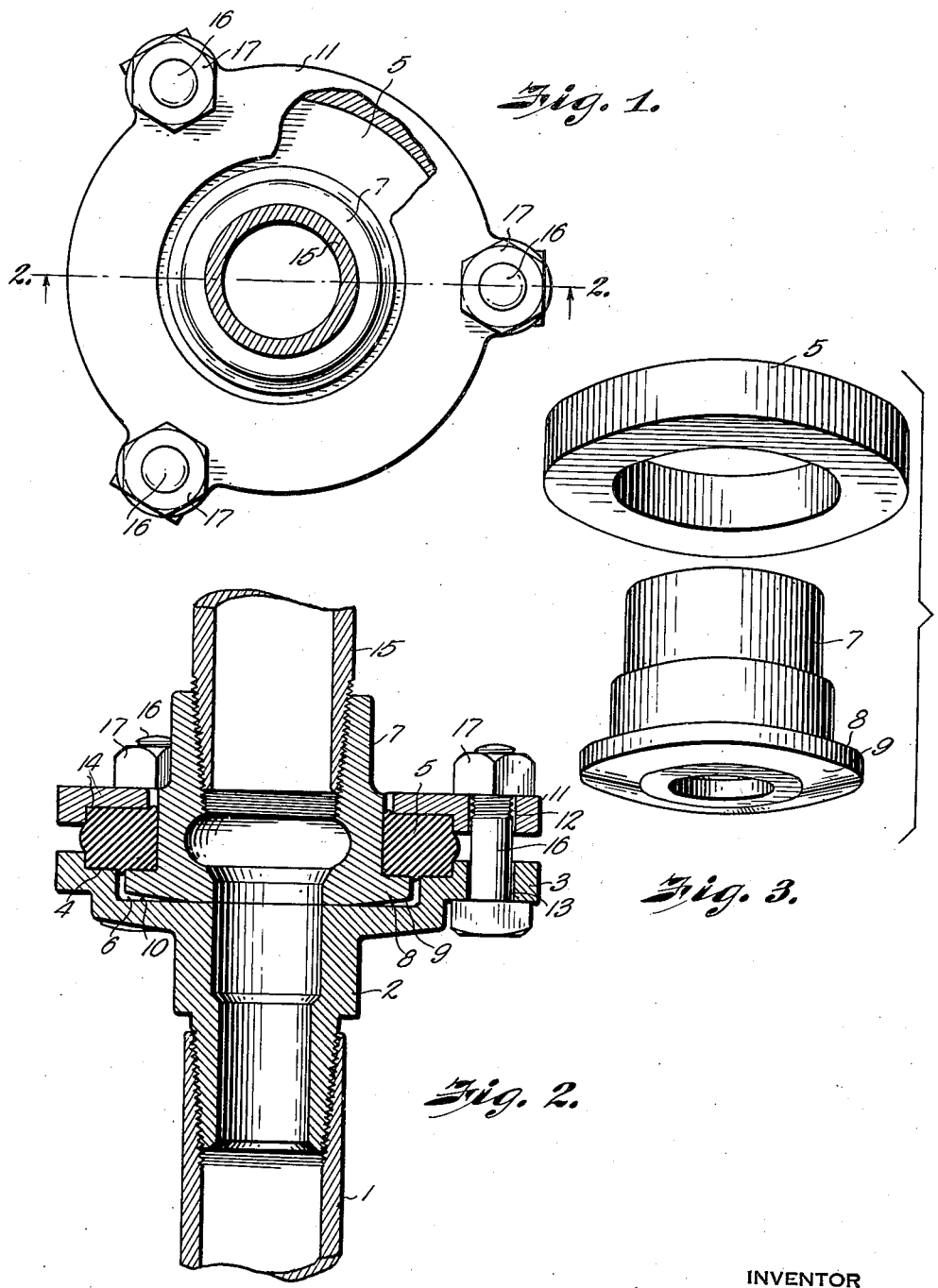
INVENTOR
Virgil F. Halliburton
BY
ATTORNEY March 4, 1941.        V. F. HALLIBURTON        2,234,119
STUFFING BOX MOUNTING
Filed Jan. 31, 1940        2 Sheets-Sheet 2
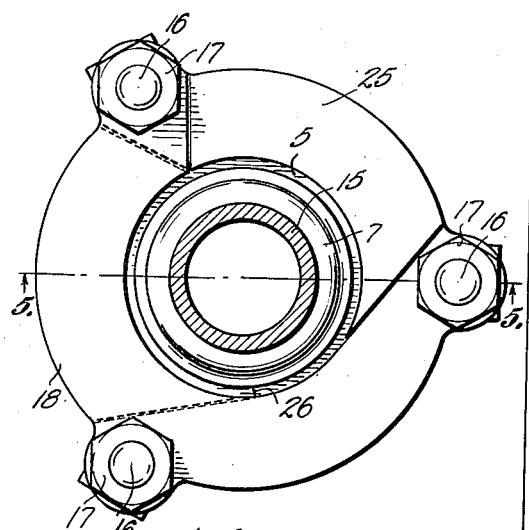
Fig. 4.
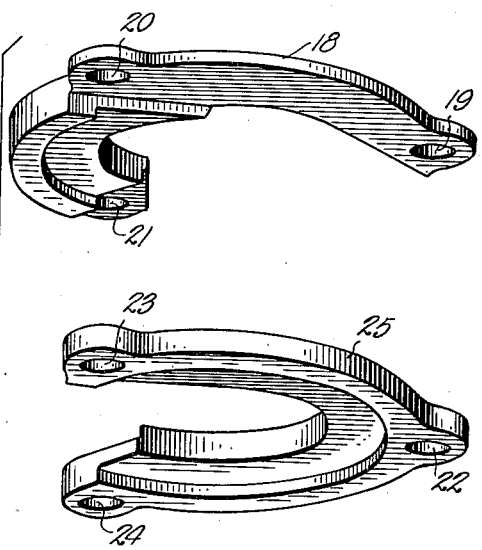
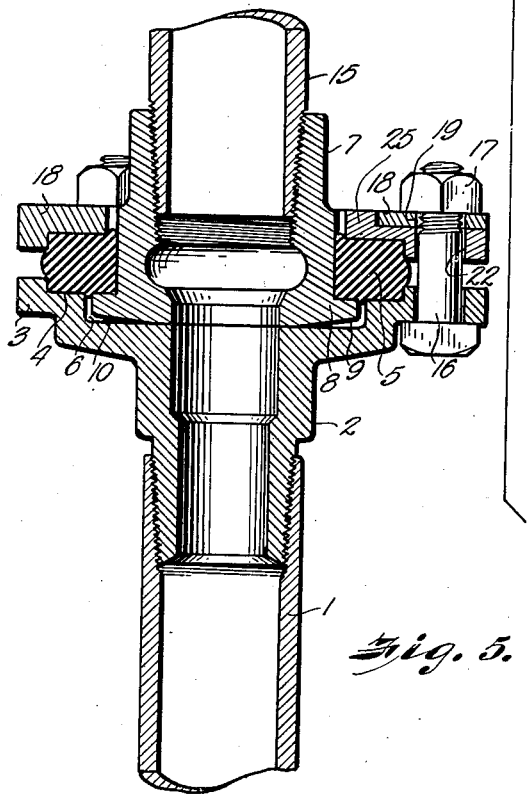
Fig. 5.
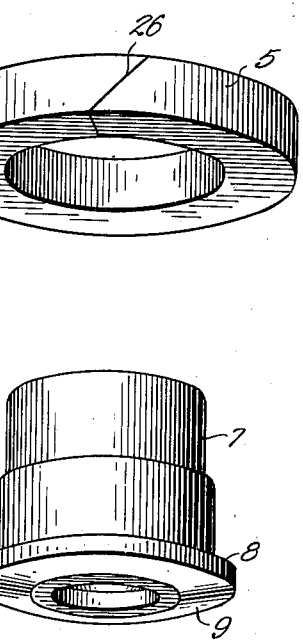
Fig. 6.
INVENTOR
Virgil F. Halliburton
BY
ATTORNEY Patented Mar. 4, 1941

2,234,119

UNITED STATES PATENT OFFICE 2,234,119

STUFFING BOX MOUNTING

Virgil F. Halliburton, Kansas City, Mo., assignor to Gustin-Bacon Manufacturing Company, Kansas City, Mo., a corporation of Missouri Application January 31, 1940, Serial No. 316,570

2 Claims. (Cl. 285—136)

My invention relates to stuffing box mountings and more particularly to a flexible mounting for a stuffing box for use in connection with the pumping of oil wells.

The rod string in the pumping of oil wells is given a reciprocating motion by a walking beam. The reciprocating rod undergoes an oscillating or angular motion in addition to its reciprocation. Since an oil well stuffing box must serve as a guide for the polish rod in addition to acting as a seal, this motion contributes to the wear of the packing members. When the stuffing box becomes worn, both oil and gas may escape from the well, producing a serious fire hazard as well as a loss of fluid and gas pressure from the well.

One object of my invention is to provide a means for supporting a stuffing box enabling the stuffing box to be self-aligning.

Another object of my invention is to provide a support for a stuffing box which will enable the stuffing box to follow the angular motion of the reciprocating rod.

Other and further objects of my invention will appear from the following description.

In the accompanying drawings which form part of the instant specification and which are to be read in conjunction therewith, and in which like reference numerals are used to indicate like parts in the various views;

Figure 1 is a top plan view of a flexible stuffing box support of my invention.

Figure 2 is a sectional view taken on a line 2—2 of Figure 1.

Figure 3 is an exploded view of two elements of the assembly shown in Figure 2.

Figure 4 is a top plan view of a stuffing box support showing another embodiment of my invention.

Figure 5 is a sectional view taken along the line 5—5 of Figure 4.

Figure 6 is an exploded view of a portion of the assembly shown in Figure 5.

In general, my invention contemplates a stuffing box support which will enable the stuffing box carried thereby to be self-aligning to compensate for the slight oscillatory movement of the reciprocating pump rod.

More particularly referring now to the drawings, the reference numeral 1 indicates the well casing or tubing or an extension of the well casing or tubing. A member 2 is threadedly secured to the casing or tubing head 1 and is formed with a flange 3 and a rabbet 4 in which a rubber or composition sealing ring 5 is adapted to seat. An annular reentrant portion 6 is also formed in the body member 2. A rocker nipple 7 is formed with a flange 8 which is provided with a convex surface 9, supported by the floor 10 of the reentrant portion 6. The convex shape of the flange 8 is a matter of choice. It may be formed with any suitable curve or an approximation of the curve by intersecting plane surfaces disposed at a slight angle to each other as shown in Figure 3. A ring 11 provided with apertures 12, adapted to be aligned with corresponding apertures 13 of the flange 3 is formed with a rabbet 14, corresponding to the rabbet 4. The ring 11 is a clamping ring which clamps the rubber or composition gasket ring 5 into sealing position as can readily be seen by reference to Figure 2. As the rocker nipple 7 rocks upon the surface 10, the rubber ring will be compressed to accommodate for movement of the rocker nipple. A nipple 15 is threadedly secured in the rocker nipple 7 and supports the stuffing box (not shown) as is well understood in the art. As the pump rod oscillates, the rocker nipple will rock to accommodate for release of the pump rod.

It is a salient feature of my invention that the weight of the stuffing box and stuffing box support nipple 15 is supported directly by metal to metal contact through the body member 2 to the casing or tubing 1. It is frequently necessary to support the string of sucker rods on the stuffing box and it will be seen that, in my invention, the weight is borne by direct thrust through metallic parts. The rubber sealing ring 5 does not have to support any of the weight of the assembly and is free to accomplish its sealing function.

In the form of the invention shown in Figures 1, 2, and 3, when it is desired to replace the rubber sealing ring 5 a split ring may be employed. The clamping ring 11 is clamped to the flange 3 by means of bolts 16 and nuts 17. The nuts 17 being unscrewed, the clamping ring 11 may be lifted to permit the insertion of a split sealing ring.

In order to enable the removal of the clamping ring completely when it is desired to replace the sealing ring 5, I may use a separable clamping ring made of two parts as shown in Figures 4, 5, and 6. The clamping ring is made of two interfitting horseshoe shaped rings, as can best be seen by reference to Figure 6. The upper horseshoe shaped portion 18 is provided with three openings 19, 20, and 21, which may be aligned with openings 22, 23, and 24 in the lower horseshoe shaped member 25. When so aligned, the two parts form a clamping ring having the cross sectional shape of the ring 11 of Figure 2, as can readily be seen by reference to Figure 5. The rubber ring 5 in Figure 6 is provided with a split portion 26, enabling it to be passed around the nipple 13.

It will be seen that I have accomplished the objects of my invention. I have provided a simple and efficient support for a stuffing box, enabling the stuffing box to accommodate itself for oscillating movement of the pumping rods and thus am enabled to eliminate unnecessary wear on the packing members of the stuffing box. The stuffing box assembly is supported by metal to metal contact directly from the casing of the well. When the sucker rods are assembled, the load of the rods may be taken by the stuffing box and transmitted directly to the oil well casing without any danger of rupturing or injuring the coupling. The rubber packing ring for the coupling takes none of the weight of the sucker rods. At the same time, a tight seal is maintained during the movement of the rocker nipple occasioned by the movement of the pump rods.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. Means for flexibly mounting a well pump rod stuffing box on a casing or tubing comprising a first member having a stepped bore, a second member having a flange with a convex lower surface seated on a step of said bore, a resilient sealing ring carried by said second member and seating upon said flange and another step of said first member, a clamping ring partially surrounding the sealing ring and spaced from the first member by the sealing ring, and holding means connecting said clamping ring to said first member to provide for limited rocker movement of said second member on said first member.

2. A mounting as in claim 1 in which said clamping ring is formed of a pair of overlapping parts and each of said holding means passes through both of said overlapping parts.

VIRGIL F. HALLIBURTON.